United States Patent [19]

Tanaka et al.

[11] Patent Number: 5,195,574
[45] Date of Patent: Mar. 23, 1993

[54] AUTOMOBILE AIR CONDITIONING SYSTEM

[75] Inventors: Kazumasa Tanaka, Isehara; Joji Shimizu, Atsugi, both of Japan

[73] Assignee: Nissan Motor Co., Ltd., Yokohama, Japan

[21] Appl. No.: 750,946

[22] Filed: Aug. 28, 1991

[30] Foreign Application Priority Data

Sep. 17, 1990 [JP] Japan .................................. 2-243908

[51] Int. Cl.⁵ .................. F25B 29/00; B60H 3/00; B61D 27/00
[52] U.S. Cl. .................................... 165/22; 165/24; 165/42; 165/43; 165/31; 62/244; 454/70; 454/75
[58] Field of Search .................. 165/22, 42, 43, 24, 165/31; 62/244; 454/70, 75

[56] References Cited

U.S. PATENT DOCUMENTS

| | | | |
|---|---|---|---|
| 4,665,971 | 5/1987 | Sakurai | 165/22 |
| 4,681,153 | 7/1987 | Uchida | 165/42 |
| 4,762,169 | 8/1988 | Andersen et al. | 165/22 |
| 4,901,788 | 2/1990 | Doi | 165/22 |
| 4,938,033 | 7/1990 | Ogihara et al. | 236/91 F |

OTHER PUBLICATIONS

Service Manual No. 578E, pp. 93-103, published by Nissan Motor Co., Ltd., in 1987.

Primary Examiner—John K. Ford
Attorney, Agent, or Firm—Foley & Lardner

[57] ABSTRACT

An automobile air conditioning system supplies conditioned air to the passenger compartment of an automobile. The air conditioning system includes an evaporator for cooling the incoming flow of air and a heater core for heating the incoming air from said evaporator to a predetermined temperature. The air conditioning system also includes front and rear vent units for expelling conditioned air, and a control unit which includes a single mode selector for expelling heated air out the front vent unit and a dual mode selector for expelling heated air out both the front and rear vent units. A bypass for directly leading air from the cooling unit to the front vent unit is provided for the air conditioning system. The control unit opens the bypass when the single mode and maximum cooling mode are selected, and closes the bypass when the dual mode is selected.

8 Claims, 5 Drawing Sheets

AUTOMOBILE AIR CONDITIONING SYSTEM

BACKGROUND OF THE INVENTION

1. Field of the Invention

This invention relates to an automobile air conditioning system which supplies air to both the front and rear sections of the passenger compartment.

2. Description of the Prior Art

There are currently known a number of air conditioning systems for automobiles, which supply air to both the front and rear sections of the passenger compartment of an automobile.

These air conditioning systems comprise an evaporator for cooling the air that enters via the air inlet port and a heater core which is located behind the evaporator. An air mixing damper is located in front of the heater core, and opens and closes to regulate the amount of air flowing through the heater core, so that the temperature of air flowing to the passenger compartment is controlled.

With this type of air conditioning system, a single mode can be selected so that the conditioned air is blown out only via a front vent unit. When a dual mode is selected, the air is sent to both the front and rear vent units.

There is another type of air conditioning system, which allows part of the air cooled by the evaporator to pass through to the front vent unit, bypassing the heater core, thereby increasing the amount of airflow through the front vent unit and enabling the noise level to be reduced.

However if the bypass remains open when the single mode is switched to the dual mode during a maximum cooling mode, the amount of airflow through the front and rear vent units may be uneven, making it difficult to aircondition the compartment evenly.

SUMMARY OF THE INVENTION

It is therefore an object of this invention to provide an air conditioning system which can cool the entire passenger compartment of the automobile evenly.

Another object of this invention is to provide an air conditioning system which can increase the amount of airflow through the front vent unit and reduce the noise level.

These and other objects can be achieved according to this invention, as shown in FIG. 1, by providing an automobile air conditioning system for supplying conditioned air to a passenger compartment of the automobile, comprising:

a cooling unit for cooling an incoming flow of air;

a heating unit for heating incoming air from the cooling unit to a predetermined temperature;

front and rear vent units for expelling conditioned air;

a single mode selector for expelling heated air out the front vent unit;

a dual mode selector for expelling heated air out both the front and rear vent units;

a bypass for directly leading air from the cooling unit to the front vent unit; and a control unit for opening the bypass when a single mode is selected by the single mode selector and a maximum cooling mode is selected, and for closing the bypass when a dual mode is selected by the dual mode selector.

Air cooled by the cooling unit 1 is heated by the heating unit 3 to keep the air temperature at a desired level. When the single mode selector 5 is operated, air heated by the heating unit 3 is blown out via the front vent unit. When the single and maximum cooling modes are selected, the bypass 9 opens allowing part of the air cooled by the cooling unit 1 to pass directly through to the front vent unit without passing through the heating unit 2. By increasing the amount of the air flowing via the front vent unit, the noise level can be reduced.

When the dual mode is selected by the dual mode selector 7, the bypass 9 is closed enabling the heated air to be sent via the front and rear vent units.

The amount of air flowing via the front and rear vent units is set at an optimum ratio, thereby cooling the passenger compartment evenly.

DETAILED DESCRIPTION OF THE PREFERRED EMBODIMENTS

An air conditioning system according to a first embodiment of this invention will be described with reference to the accompanying drawings.

Figure 2:
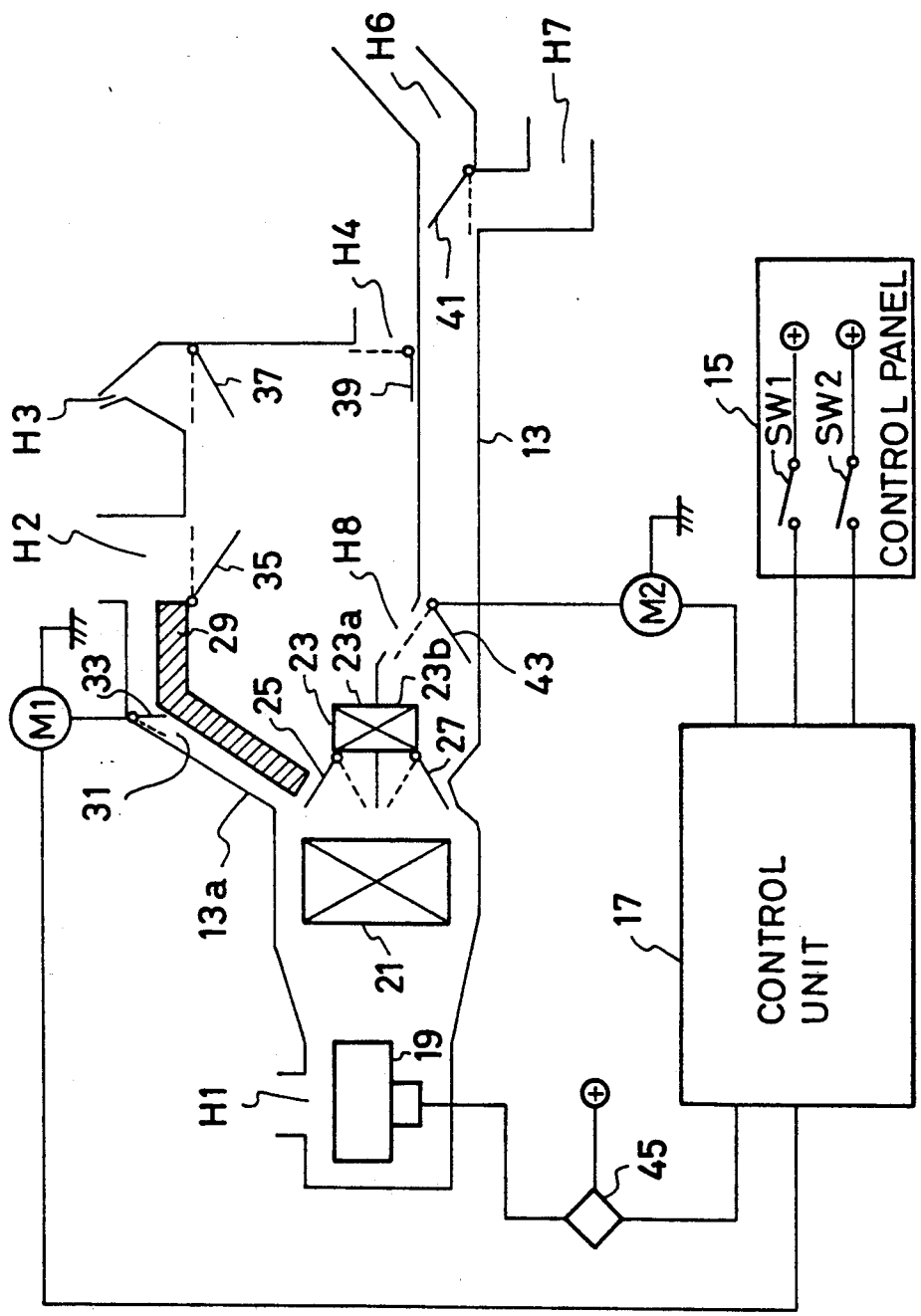
FIG. 2 shows the overall configuration of an air conditioning unit according to one embodiment of this invention.

As shown in FIG. 2, the air conditioning system comprises an air conditioning unit 13 for conditioning air in the passenger compartment of an automobile, a control panel 15 containing a number of different switches, and a control unit 17 for controlling the air conditioning unit 13 based on data from the control panel 15.

The air conditioning unit 13 comprises: a blower 19, which expels incoming air from an air inlet port H1 to an evaporator 21. The evaporator 21 cools air from the blower 19. Namely, the evaporator 21 is included in the cooling unit 1 in FIG. 1. Also, a heater core 23 is included in the heating unit 3 in FIG. 1. The heater core 23 heats air cooled by the evaporator 21. The heater core 23 includes two sections 23a, 23b. The heater core sections 23a, 23b have air mixing dampers 25, 27 which are located in the front at the side and are connected to the front and rear vent units, respectively. The air mixing damper 25 fluctuates between a high temperature position, indicated by a solid line and a low temperature position indicated by a dotted line. Similarly, the air mixing damper 27 fluctuates between the high and low temperature position indicated by solid and broken lines, respectively. The amount of air flowing via the heater cores 23a, 23b is controlled according to the positions of the air mixing dampers 25, 27, so that the temperature of air blowing via the front and rear vent units is controlled.

A partition 29 is located near a front vent nozzle H2 along a side wall 13a of the air conditioning unit 13. The side wall 13a and the partition 29 form a bypass 31 leading to the front vent nozzle H2. The bypass 31 has a damper 33, which is moved to a position indicated by a dotted line when the maximum cooling mode and the single mode are selected. (Both of these will be described later.) By movement of the damper 33 as above, part of the air cooled by the evaporator 21 is directly fed into the front vent nozzle H2. A damper 35 is located near the front vent nozzle H2. The damper 35 is moved to a position indicated by a solid line to open the front vent nozzle H2, while it is moved to a position indicated by a dotted line to close the front vent nozzle H2. A damper 37 is located in the vicinity of a defroster vent nozzle H3. The damper 37 is moved to a position indicated by a solid line and then to a position indicated by a dotted line in order to open and close, respectively the defroster vent nozzle H3. A damper 39 is located near a front foot vent nozzle H4. When moved to a position indicated by a solid line and to a position indicated by a dotted line, the damper 39 can open and close, respectively the front foot vent nozzle H4. The front vent nozzle H2, defroster vent nozzle H3, and front foot vent nozzle H4, located near the front seats, make up the front vent unit.

A rear vent nozzle H6 and a rear foot vent nozzle H7 located near the rear seats make up the rear vent unit. A damper 41 is located near the rear foot vent nozzle H7. When moved to a position indicated by a solid line, the damper 41 opens the rear foot vent nozzle H7 and closes the rear vent nozzle H6. Then, the damper 41 is moved to the position indicated by a dotted line to open the rear vent nozzle H6 and to close the rear foot vent nozzle H7.

A damper 43 is located near an air passage H8. The damper 43 is moved to the position indicated by a solid line to select the single mode, or to a position indicated by a dotted line to select a dual mode. (These modes will be further described later.) When the damper 43 is moved to the solid-line position, the rear vent unit is closed so that air passing through the heater core sections 23a, 23b is fed to the front vent unit via the air passage H8. When the damper 43 moves to the dotted-line position, the air passage H8 closes to allow air passing via the heater core section 23a to be fed to the front vent unit, and air passing via the heater core section 23b to be fed to the rear vent unit.

The control panel 15 contains a number of switches such as a switch SW1 for establishing the maximum cooling mode and a switch SW2 for blowing air via the rear vent nozzle H6 in the vicinity of the rear seats.

The control unit 17 is connected to motors M1, M2 for opening and closing the dampers 33, 43. The control unit 17 is connected to the blower 19 by a power source 45. The control unit 17 also includes a central processing unit CPU which performs various control operations based on data inputted from the control panel 15. When the switch SW1 is turned on, the control unit 17 drives a non-illustrated motor to move the air mixing dampers 25, 27 to the positions indicated by the dotted lines, thereby minimizing or stopping the air flowing via the heater core 23 to establish the maximum cooling.

Figure 1:
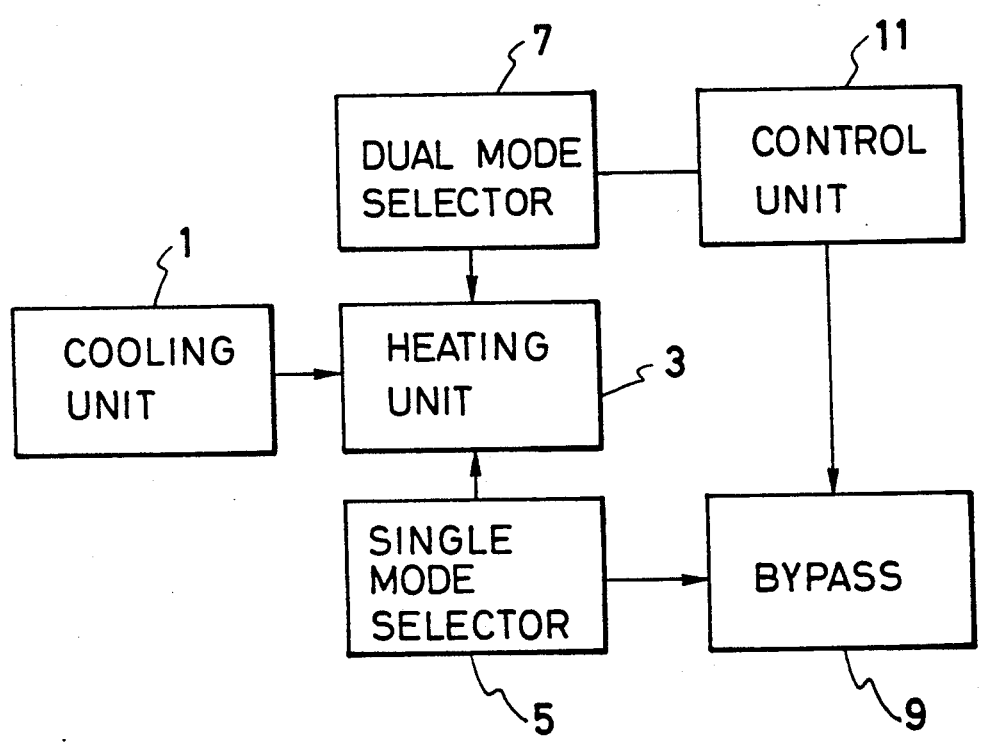
FIG. 1 is a block diagram of an air conditioning system according to this invention.

The control unit 17 also includes single and dual mode selectors 5, 7 in FIG. 1. To select the dual mode, having turned on the rear vent switch SW2, the motor M2 sets the damper 43 in operation, moving it to the dotted line position. A non-illustrated motor is also set in motion to move the damper 41 to the dotted line position, thereby blowing air via the rear vent nozzle H6. While in the dual mode, air is also blown via the front vent unit. The motor M1 is also set in motion to move the damper 33 to the solid line position to close the air passage 31. By releasing the rear vent switch SW2, the dual mode changes to the single mode. The motor M2 is set in motion to move the damper 43 to the solid line position, thus blowing air via the front vent unit having closed off the rear vent unit.

When the single and maximum cooling modes are selected, the control unit 17 opens the bypass 31. The control unit 17 can then regulate the closing of the bypass 31 when the dual mode is selected by the dual mode selector. Therefore, the control unit 17 also includes the control unit 11 in FIG. 1.

Figure 3:
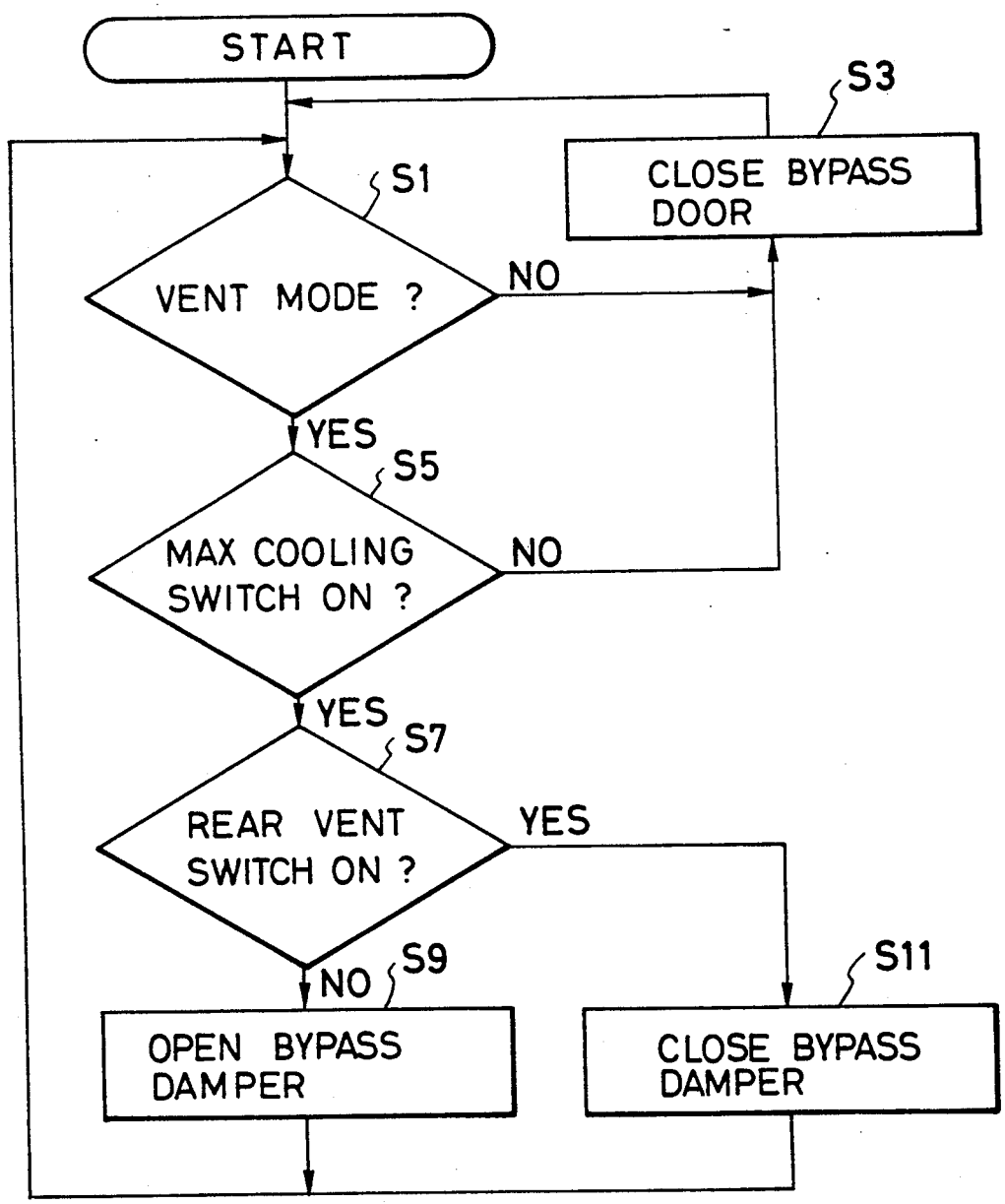
FIG. 3 is a flow chart showing how the air conditioning unit in FIG. 2 operates.
Figure 4:
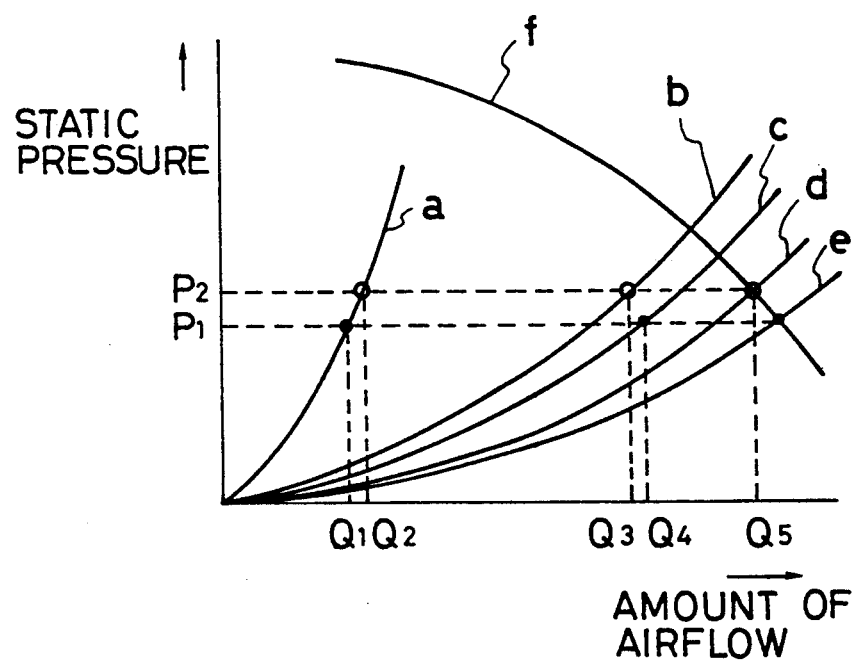
FIG. 4 shows the relationship between static pressure and the amount of airflow.

The following is a description of how the air conditioning system operates, with reference to FIGS. 3 and 4.

In the step S1, the control unit 17 can detect whether or not the air conditioning system is in the vent mode. If it is not, the control goes to the step S3 to move the bypass damper 33 to the solid line position and close the air passage 31. If the system is already in the vent mode in the step S1, the control goes to the step S5, checking whether or not the switch SW1 has been turned onto the maximum cooling mode. In cases where the switch S1 has not been turned on in the step S5, the control goes to the step S3. In cases where the switch S1 has been turned on in the step S5, the control goes to the step S7 to confirm whether the rear vent switch SW2 has been turned on. If the rear vent switch SW2 has not been turned on, that is in the single mode, the control moves on to the step S9 from the step S7, thereby moving the damper 33 to the dotted line position to open the air passage 31. Part of the air cooled by the evaporator 21 is then directly blown from the front vent nozzle H2 via the air passage 31. In this way, the amount of the air flowing via the front vent unit is increased, while the noise level is reduced.

In the step S7, if the rear vent switch SW2 has been turned onto the dual mode, the control moves to the step S11 to move the bypass damper 33 to the solid line position to close the air passage 31. Thus, air blown via the front vent nozzle H2 will be decreased to cool the entire passenger compartment evenly.

FIG. 4 shows the relationship between the static pressure of the blower and the amount of airflow. In FIG. 4, a curve (a) represents the static pressure versus the amount of airflow from the rear vent unit, while a curve (b) represents the static pressure versus the amount of the airflow from the front vent unit in the dual mode in which the bypass damper 33 is closed; a curve (c) represents the static pressure versus the amount of airflow from the front vent unit in the dual mode, in which the bypass damper 33 is opened; a curve (d) represents an overall amount of airflow in the dual mode, in which the bypass damper 33 is closed; and a curve (e) represents the overall amount of airflow in the dual mode, in which the bypass damper 33 is opened.

A comparison will be made to show the ratio between $Q_F$ and $Q_R$ of the airflow from the front and rear vent units in the dual mode, in which the bypass damper 33 is opened and closed, respectively.

When the static pressure is P1 and the bypass damper 33 remains open in the dual mode, the ratio ($Q_{FO}$:$Q_{RO}$) is expressed as:

$$Q_{FO}:Q_{RO} = Q_4:Q_1 \tag{1}$$

When the static pressure is $P_2$ and the bypass damper 33 remain closed in the dual mode, the ratio ($Q_{FC}$:$Q_{RC}$) is expressed as:

$$Q_{FC}:Q_{RC}=Q_3:Q_2 \qquad (2)$$

The amount of airflow $Q_2$ is larger than $Q_1$, $Q_3$ is larger than $Q_2$, and $Q_4$ is larger than $Q_3$.

Therefore, when the bypass damper 33 is closed during the dual mode, the amount of airflow $Q_4$ from the front vent unit is decreased to $Q_3$, while the amount of airflow $Q_1$ from the rear vent unit is increased to $Q_2$.

Therefore, when the bypass damper 33 is opened during the dual mode, the front of the passenger compartment will be cooled more than the rear section. On the other hand, when the bypass damper 33 is closed during the dual mode, the whole compartment will be cooled more evenly than in the case of the conventional air conditioning systems.

Figure 5:
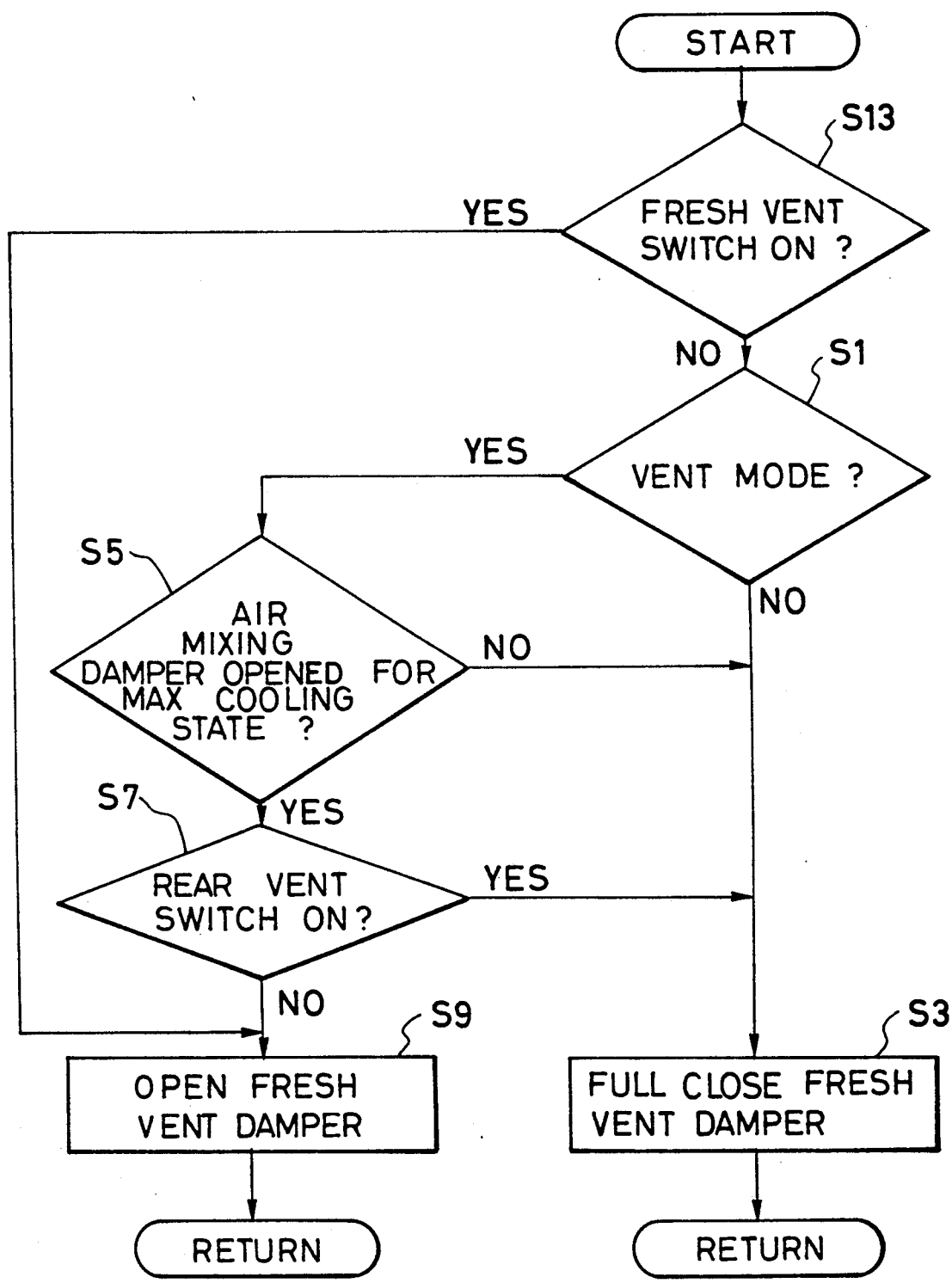
FIG. 5 is a flow chart showing how the air conditioning unit operates in relation to a second embodiment.

The following is a description of the second embodiment of this air-conditioning system, with reference to FIG. 5.

In this embodiment, a fresh vent switch is used to open and close the bypass damper 33 serving as a fresh vent damper. When the fresh vent switch is on, part of the cooled air is expelled via the front vent nozzle H2, thus cooling the passenger compartment evenly.

When it is confirmed in the step S13 that the fresh vent switch has been turned on, the control goes to the step S9 to open the fresh vent damper. Then, part of the cooled air is directly fed into the front vent nozzle H2 via the bypass 31.

If the switch has not been turned on, the control goes to the step S1. The steps S1 to S9 are identical to those shown in FIG. 3, thus it is not necessary to give a detailed description.

During the step S5, it is necessary to check whether or not the switch SW1 has been turned onto the maximum cooling mode. that is, whether the air mixing damper is fully opened to the maximum cooling side. If the switch SW1 has not been turned on, the control moves on to the step S7. However, this invention is not limited to the above, and other control may be done in the step S5.

A temperature controller may be used to keep the compartment temperature at the desired level. When the control in the step S7 is carried out after confirming that the lowest temperature has been set, it is not necessary to check the position of the air mixing damper, thus the overall configuration of the air conditioning system becomes simplified.

If the temperature of the air flowing from the front and rear vent units, that is, the optimum temperature, is calculated in the step S5, provided the step S7 is carried out after confirming that the optimum temperature is below a predetermined level, the air conditioning system can operate, taking into account external conditions. In this way, the passenger compartment can be maintained at a comfortable temperature.

What is claimed is:

1. An automobile air conditioning system for supplying conditioned air to a passenger compartment of an automobile, comprising:
   cooling means for cooling an incoming flow of air;
   heating means for heating incoming air from said cooling means to a predetermined temperature;
   front and rear vent means for discharging air to front and rear sections of the passenger compartment, respectively, said front vent means having a front vent nozzle;
   single mode selector means for expelling temperature conditioned air out only said front vent means;
   dual mode selector means for expelling temperature conditioned air out both said front and rear vent means;
   bypass means for directly leading air from said cooling means to said front vent nozzle; and
   control means for opening said bypass means when both a single mode is selected by said single mode selector means and a maximum cooling mode is selected, and for closing said bypass means when a dual mode is selected by said dual mode selector means.

2. The automobile air conditioning system according to claim 1, wherein said cooling means includes an evaporator for cooling the incoming flow of air.

3. The automobile air conditioning system according to claim 2, wherein said heating means includes a heater core for heating the incoming air from said evaporator, said heater core including two sections having air mixing dampers connected to said front and rear vent means respectively, said air mixing dampers fluctuating between a high and low temperature position so as to control an amount of air flowing via said heater core sections.

4. The automobile air conditioning system according to claim 1, wherein said bypass means includes a damper which is open to directly feed air into said front vent nozzle when both the single mode is selected and the maximum cooling mode is selected and which is closed when the dual mode is selected.

5. The automobile air conditioning system according to claim 1, wherein said control means includes said single and dual mode selector means.

6. The automobile air conditioning system according to claim 1, wherein said control means includes a switch for establishing the maximum cooling mode.

7. The automobile air conditioning system according to claim 4, further comprising a motor for opening or closing said damper according to instructions of said control means.

8. The automobile air conditioning system according to claim 1, wherein said temperature conditioned air expelled out only said front vent means is heated air and said temperature conditioned air expelled out both said front and rear vent means is heated air.

* * * * *